May 25, 1943. C. M. O'BOYLE Re. 22,325
PROTECTOR
Original Filed Oct. 6, 1934
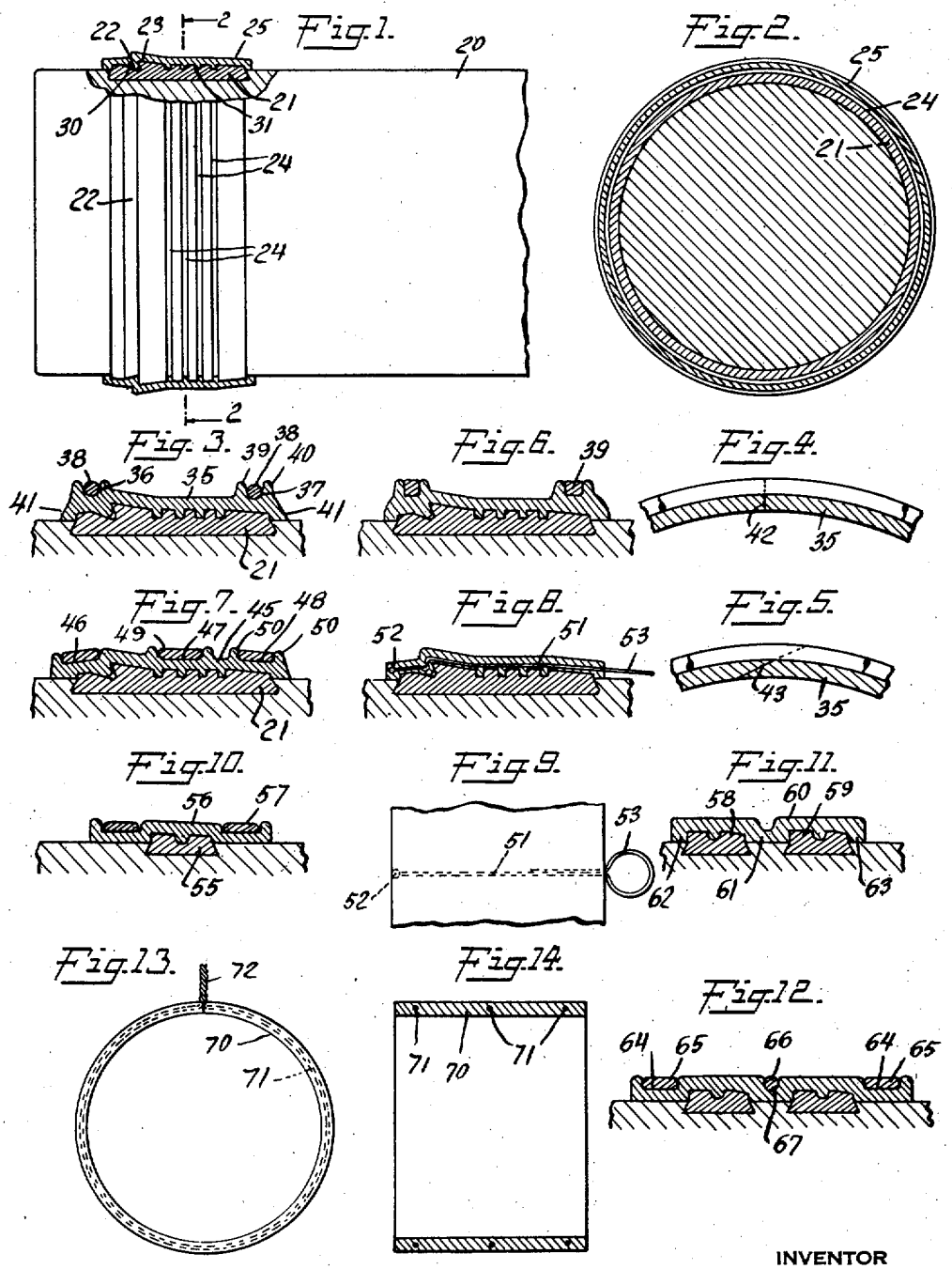
INVENTOR
Charles M. O'Boyle
BY
Marshall & Hawley
ATTORNEYS.

Reissued May 25, 1943

Re. 22,325

UNITED STATES PATENT OFFICE 22,325

PROTECTOR

Charles M. O'Boyle, Wilmington, Del.

Original No. 2,091,330, dated August 31, 1937, Serial No. 747,122, October 6, 1934. Application for reissue May 13, 1938, Serial No. 207,849

4 Claims. (Cl. 102—1)

This invention relates to protectors and particularly to means for protecting the rifling bands of shells or projectiles.

Such bands are formed of relatively soft metal, such as copper, and in shipment or handling are easily damaged and become unserviceable. Various devices have been proposed for protecting the rifling bands but these proposed constructions have not been entirely satisfactory due to various causes. For example, protectors formed of fabric or rope expand when subjected to moisture or rain and are thus loosened.

A device of this character to be satisfactory must be so designed as to effectively protect and prevent injury or damage to the rifling band and also must be so constructed that it can be readily and quickly removed.

This invention has for its salient object to provide an efficient protector for rifling bands that is simple in construction, economical to manufacture and can be easily and quickly applied and removed.

Another object of the invention is to provide a protector so constructed and so secured that it will be firmly held in place and will not be shifted or displaced during transportation or handling of the projectiles.

The fabric and rope devices of the prior art heretofore referred to are not pre-formed as articles of manufacture but consist only of strips of fabric and lengths or coils of rope which exist previously as such and not in the final form of a protector adapted for instant and accurate application to a projectile and to the rifling band thereof, sometimes also known as a rotating band. In fact and in practice such material as canvas and rope must be improvised on each occasion to fit individual characteristics and peculiar conformations of the particular type of rifling or rotating band to be dealt with. The improvisation is in the hands of individuals at the time charged with the duty of wrapping such fabric or rope about the rifling or rotating bands. The result is therefore haphazard and random and depends upon the personal equation.

It is the purpose of the present invention to prevent the possibility of mutilation and destruction of the rifling or rotating bands by eliminating casual application to the bands of initially non-conforming protectors that are applied often by inexperienced hands, and to this end the invention contemplates the provision of a structurally pre-formed band supplied initially as an article of manufacture possessing an inner surface which conforms to the external contour of the gas check grooves and projections on a rifling or rotating band, which may be applied readily and quickly by the uninitiated and which possesses the property and characteristic of resisting strong forces that would tend to dislodge it in an axial direction, and at the same time providing adequate and complete protection to the rifling or rotating band, and in particular interposing a necessary protective material to avoid the projections of the rifling or rotating band being mashed down or distorted by blows incident to the falling of the projectile or from any other source.

Further objects of the invention will appear from the following specification taken in connection with the drawing which forms a part of this application, and in which Fig. 1 is a fragmentary view showing a portion of a shell and showing the rifling band and protector in section;

Fig. 2 is a sectional elevation taken at right angles to Fig. 1 and substantially on line 2—2 of Fig. 1;

Fig. 3 is a detail sectional elevation of a portion of a shell, the rifling band and protector showing a slightly modified form of construction;

Fig. 4 is a fragmentary sectional elevation taken at right angles to Fig. 3 through one of the peripheral grooves in the protector and the securing means disposed therein;

Fig. 5 is a view similar to Fig. 4 but showing the ends of the protecting strip beveled or tapered and overlapping;

Fig. 6 is a view similar to Fig. 3 but showing the securing means as consisting of a band square in section instead of round;

Fig. 7 is a view similar to Fig. 3 but illustrating a further modification of the construction;

Fig. 8 is a view similar to Fig. 1 but showing a wire secured to one edge of the protector and extending therebeneath for severing the protector;

Fig. 9 is a plan view taken at right angles to Fig. 8;

Fig. 10 is a view similar to Fig. 7 but showing a different configuration of rifling band and protector adapted for use therewith;

Fig. 11 is a view similar to Fig. 10 but showing a further modification of the rifling band and protector;

Fig. 12 is a view similar to Fig. 11 showing a modified form of protector and securing means;

Fig. 13 is a sectional elevation showing a protector and another form of means for securing the protector in position; and Fig. 14 is a sectional elevation taken at right angles to Fig. 13.

The invention briefly described consists of a protector adapted for use in protecting the rifling band of a projectile or shell and having its inner surface conforming in shape to the outer surface of the rifling band. For instance, rifling bands are commonly provided with annular projecting portions and recesses or grooves serving as gas checks and the inner surface of the protector is provided with an inwardly extending portion adapted to fit into the annular groove and to receive the annular projecting portion.

The protector may be and is preferably formed of elastic material, such as rubber, and may consist of an annular band arranged to fit over the rifling band or may consist of a strip arranged to encircle and be secured around the rifling band. The securing means, such as straps or annular elastic bands, extends around the protector and is preferably seated in annular grooves to such an extent that the bands will not be displaced during the transportation or handling of the projectile. In one form of the invention severing means is provided in the form of a wire extending beneath the protector and secured thereto adjacent one edge thereof.

Further details of the invention will appear from the following description.

In the particular embodiment of the invention illustrated in Figs. 1 and 2 there is shown a shell or projectile 20 having a rifling band 21 of copper or like metal. The rifling band has formed in its outer periphery an annular gas check groove 22 and an annular projection 23. The band also has a plurality of annular grooves 24 which serve as gas checks.

During transportation or shipment of shells the rifling bands are damaged, often to such an extent as to render them unserviceable. In order to protect the rifling bands there is provided an annular band 25 which may be formed of any suitable material, such as pulp fiber or textile material, but is preferably formed of elastic material, such as rubber.

The protector 25 has an inwardly projecting rib 30 conforming in shape to the gas check groove 22 and also has inwardly extending annular ribs 31 arranged to seat in the annular grooves 24 in the rifling band. The edges of the protector 25 are preferably extended over the edges of the rifling band 21 and seat on the outer surface of the shell.

In the form of the invention shown in Figs. 1 and 2 the protector consists of an annular elastic band which is stretched to extend over the rifling band and upon release tightly grips the rifling band and is securely held thereon. The inwardly projecting ribs which are seated in the annular or peripheral grooves of the rifling band prevent longitudinal displacement of the protector.

In the form of the invention illustrated in Figs. 3 and 4 the rifling band 21 is substantially the same in shape and configuration as that shown in Figs. 1 and 2. This statement also applies to the inner surface of the protector 35. The outer surface of the protector has formed therein annular recesses or grooves 36 and 37 which receive annular elastic bands or securing means 38. The securing means or bands 38 are protected by the outwardly-projecting ribs 39 and 40 which extend outwardly at the edges of the grooves 36 and 37. Thus the securing means or bands 38 are insured against accidental displacement during transportation or handling. The edges 41 of the protector extend over the edges of the rifling band and seat on the peripheral surface of the shell.

The protector shown in Fig. 3 may consist of an annular ring or band or may consist of a strip which encircles the rifling band and has its ends abutting, as shown at 42 in Fig. 4. Fig. 5 shows the ends of the strip beveled and overlapping at 43.

Fig. 6 shows a protector similar to that shown in Fig. 3, but with spaced grooves of substantially rectangular cross-section, with retaining bands 39 of similar shape in them.

Fig. 7 shows another modification of a protector for the rifling band 21. The protector 45 is similar to that shown in Figs. 3 and 6, but is provided with annular flat grooves 46, 47, and 48 which receive flat straps or bands 49, the bands being disposed between the annular projecting ribs 50 which extend outwardly at the edges of the grooves.

Figs. 8 and 9 show the same form of protector as that illustrated in Fig. 1, but in addition thereto show a wire 51 which is secured in any suitable manner, as shown at 52, to the protector at one edge thereof and extends across the rifling band within the protector beneath the major portion of the thickness of the protector, as shown in Fig. 8. At its free end the wire has formed thereon or secured thereto a loop or ring 53. When the protector is to be removed an upward pull on the ring will cause the wire to sever the protector.

Fig. 10 shows another type of rifling band 55 and a protector 56 encircling the band and secured in position by flat straps or bands 57. This construction is similar to that illustrated in Fig. 7.

Fig. 11 shows still another type of rifling band in which two bands 58 and 59 are used. The protector 60 has an inwardly extending annular rib 61 arranged to fit between the bands 58 and 59 and also has inwardly extending annular flanges or ribs 62 and 63 at the edges thereof arranged to extend over the outer edges of the rifling bands and to seat against the periphery of the shell. The protector 60, shown in Fig. 11, may be formed as an elastic band or may consist of a strip encircling the rifling bands. In the latter case the protector is extended, as shown in Fig. 12, at its lateral edges to form grooves 64 which receive annular straps or bands 65. A band 66 encircles the central portion of the protector being disposed in an annular groove 67.

In the embodiment of the invention shown in Figs. 13 and 14 there is illustrated a protector 70 having embedded therein wires 71. The protector 70 is formed as a strip and when used is wrapped around the rifling band and the ends of the wires 71 are twisted together, as shown at 72 in Fig. 13. It will be understood that the protector 70 shown in Figs. 13 and 14 may have the form or configuration of the protectors illustrated in the preceding figures.

In Fig. 11 definite ribs 62 and 63 are formed upon the side edges of the protector band at the margins thereof. These internal ribs 62 and 63 have internal walls which lie flat against the cylindrical surface of the projectile beyond the rifling or rotating bands. These internal ribs 62 and 63 have also walls that are generally radial of the projectile and which fit closely against the side walls of the rifling or rotating bands.

In Fig. 12 large marginal areas of the protector band lie in contact with the cylindrical surface of the projectile and are held thereagainst by the securing means 65. These overlapping or extended side portions of the protector also have walls which fit against the side edges of the rifling or rotating bands.

In Fig. 3 the overlapping or extended edges of the protector band are indicated at 41, and such edges have walls which lie flush against the cylindrical surface of the projectile and other walls at substantially right angles thereto which abut against the side edges of the rifling or rotating band 21.

In all of the other figures, including Fig. 1, a similar construction is shown. In other words the protector band is wider than the rifling or rotating band of the projectile. The protector band is so much wider relative to the rifling or rotating band that it possesses ample marginal or edge portions extending at both sides beyond the rifling band whereby both marginal edges may lap over against the radial edge walls of the rifling band and down upon the cylindrical surface of the projectile 20. It will be noted that means are provided for centering the improved protector band on the rifling band whereby due portions of the marginal parts will extend beyond both edges of the rifling band. This centering means involves in Fig. 1 the internal projections 31 on the band which interfit or mesh with the gas check grooves of the rifling band, or the inwardly projecting rib on the protector band which extends into the undercut gas check groove 22 lying partially beneath the annular projection of the rifling band, or either of these agencies. The internal projections 31 are made to rather accurately fit the gas check grooves 24. In a similar manner the internal rib 30 of the protector band is made of a size and shape to conform rather accurately to the conformation of gas check groove 22. Thus when the improved protector is in place, and it may be accurately and quickly put in place because of the interfitting relation of its internal projections with the grooves of the rifling band, such improved protector is centered with relation to the rifling band it is intended to protect; and in such position definite and predetermined widths of marginal portions of the improved protector band extend beyond the side edges of the rifling band in opposite axial directions. These uniform marginal portions may thus be calculated to fulfill the functions desired of them, namely, to encompass the radial side edges of the rifling band and to hug substantial areas of the cylindrical external wall of the projectile at each side of the rifling band. As shown most clearly in Fig. 3, the side edge walls of the rifling band 21, and which have been described as generally radial with respect to the projectile, although they are at a slight angle to the true radial plane, form with the cylindrical surface of the projectile angled corners which run all around the projectile and are rather difficult to fill with any material of which protectors are ordinarily made, for instance with fabric or rope, even supposing careful attention of experienced hands is used to wind the fabric or rope around the projectile and band. The importance of filling these annular angled spaces lies in the desirability of providing within itself the resistance to casual axial displacement after the protector band has once been put in place. For a protector band not having interfitting or intermeshing parts with the gas check grooves of the rifling band, the importance of preventing axial creeping of the protector is not nearly so great. Of course applicant's interfitting and conforming interior construction of protector band will itself cooperate with the complemental contours of the rifling band to resist axial movement of the protector with reference to the rifling band. Thus the internal construction cooperates with the marginal overlapping construction of the protector band to avoid this creeping or axial displacement. In addition the quantities or mass of material presented by the marginal portions afford protection for the edges of the rotating band.

In addition, it is to be understood that the marginal extended portions are under tension and compression, such characteristics being either inherent in the elastic material, as in the case of Fig. 1, or produced by the constrictive action of the tie-wires 38, 39, 48 etc. as in the case of Figures 3, 6, 7 etc.

Viewing Figure 3 and particularly the right hand portion of this figure, it will be noted that the recess or groove 37 is so located on the protector band 35 that it substantially surrounds the rifling band 21 at one end portion thereof with the rib 40, which defines one side of the groove 37, surrounding the radial edge of the rifling band 21 and a portion at least of the overlapping edge 41 of the protector band. When the annular securing means 38 is constricted it will of course compress the included material of the protector band 35 at the same time drawing radially inward the ribs 39 and 40. This drawing in of rib 40 will cause the rib and the included material to exert compressive strains on the overlapping edge 41 requiring this edge to flatten out upon the cylindrical surface of the projectile 20. In so flattening out it will tend to spread in opposite axial directions on the cylindrical surface of projectile 20. In moving in an axial direction to the left the overlapped edge 41 will move up against the adjacent radial edge of the rifling band 21 and tend to hug the same tightly thus resisting any tendency of the protector band 25 to creep accidentally in an axial direction on the projectile 20.

The same action will be had at the left hand side of Figure 3 whereby the annular securing means 38 conjointly with the outer ribs 40, due to the relative positions of these parts upon the protector band 35 and with reference to the end portions of the rifling band 21, will contribute to produce strong gripping edges 41 which will oppose any longitudinal motion of the protector band 35 with reference to the rifling band 21.

Additionally the inner ribs 39 will also be drawn radially inward when the securing means 38 is constricted thus exerting compressive strains upon the included material of the protector band 35, all of which tends to bind the protector band 35 more tightly against the rifling band 21. Therefore the outer ribs 40 form side walls for the grooves 37 to hold the annular securing means 38 in place; the ribs 40 also form added material and compressed material at the extreme end portions of the protector band where the device is most apt to receive knocks and jars; and the outer ribs 40 also tend to flatten down the overlapped edges 41 on the cylindrical surface of the projectile.

In addition the constrictive pressure action of wire 38 will have an axial or diagonal component causing the flexible or elastic material of the protector within it to move or flow along in a substantial axial direction of the projectile. This is important because of the relative position of groove 36 with reference to rib 30 in that this rib extends off at an angle to the right, as shown in Fig. 3. Such component action will therefore drive the rib into the recess or groove 22. The improved protector will therefore interpose a layer of protective material between a distorting force exteriorly of the annular projection 23 and such projection 23, and it will also oppose such force distorting the projection 23 by an interior cushion of protective material beneath said projection 23.

Similar conditions obtain with reference to Figs. 6 and 7.

In Figs. 10 and 12 there is no undercut gas check groove, such as at 22 in Fig. 1, but the component action of the securing means will cause the horizontal spreading out of the material of the protector to move directly against the edge radial walls of the rifling bands.

In Fig. 11, while no securing means is shown, the material will be of rubber or some other material possessing inherent resiliency causing the same to hug or automatically constrict about the projectile and its rifling band.

Where the word "band" is used in the claims, it will be understood that it refers to the protector band as described in reference to Fig. 1 or to the strip, whose ends are shown as abutting at 42 in Fig. 4.

From the foregoing description it will be clear that a simple, practical and inexpensive rifling band protector has been designed and that the protector will effectively protect the outer surface of the rifling band and can be easily and quickly applied or removed.

Although certain specific embodiments of the invention have been particularly shown and described, it will be understood that the invention is capable of use with other devices than rifling bands and is capable of modification and that changes in the construction and in the arrangement of the various cooperating parts may be made without departing from the spirit or scope of the invention, as expressed in the following claims.

What I claim is:

1. A protector for rifling bands comprising a strip arranged to encircle the band and having an inwardly extending rib arranged to fit in an external annular groove in the rifling band and having flat grooves formed in its outer surface, and flat securing means arranged to seat in said flat grooves.

2. A protector for rifling bands comprising an annular strip of material having its inner surface provided with ribs and grooves arranged to fit corresponding grooves and ribs on the periphery of the rifling band, said protector having external grooves, and ribs at the outer edges of the external grooves, and securing means seated in the external grooves, said ribs extending beyond the securing means.

3. A protector for the rifling bands of projectiles in which the rifling band projects radially outward from the cylindrical surface of the projectile and presents radial edges, and in which said rifling band further has an irregular outer surface, said protector comprising a protector band of a resilient material, said resilient protector band having on its internal face an irregular surface as a complement of the irregular outer face of said rifling band, said protector band having overlapping edges which extend beyond said radial edges of the rifling band and in upon the cylindrical surface of the projectile, said protector band having spaced pairs of annular ribs outstanding therefrom and forming annular recesses, said annular recesses occurring at substantially the end portions of said rifling band, the outer of said annular ribs extending about said overlapped edges, and annular contractile securing means occupying said annular grooves and adapted on constriction to not only radially compress the included material of said protector band against said rifling band but also to draw radially inward said outer ribs and to cause said outer ribs to compress said overlapping edges upon the cylindrical surface of the projectile and the overlapped edges to move up against said radial edges of said rifling band.

4. A protector for the rifling bands of projectiles in which the rifling band outstands from the cylindrical surface of the projectile and has substantial radial edges, and in which the rifling band is formed with a series of grooves on its outer face, one such groove near an end portion of the rifling band being undercut in a direction toward the center of the band, said protector comprising a protector band of resilient material formed on its inner face with projections to enter the grooves in said rifling band and with an internal rib extending diagonally inward to enter the undercut groove, said protector band having overlapping edges extending down upon the cylindrical surface of the projectile and against the radial edges of said rifling band, said protector band having pairs of spaced annular external ribs forming annular recesses, said recesses lying about the end portions of said rifling band, the outer ribs of each pair surrounding portions of said overlapping edges, and contractile securing means occupying the recesses between said external ribs and adapted on contraction to not only compress the included material of the resilient protector band but also to draw radially inward said pairs of external ribs whereby to cause the ribs to further radially compress the included material of the resilient protector band and cause said overlapping edges to hug the radial edges of the rifling band and be flattened against the cylindrical surface of said projectile.

CHARLES M. O'BOYLE.